United States Patent
Thomas, Jr.

(10) Patent No.: US 6,779,757 B2
(45) Date of Patent: Aug. 24, 2004

(54) PREFORMS FOR ACUTE STRUCTURAL EDGES

(75) Inventor: William A. Thomas, Jr., Arlington, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 10/185,608

(22) Filed: Jun. 28, 2002

(65) Prior Publication Data

US 2004/0000613 A1 Jan. 1, 2004

(51) Int. Cl.[7] .............................................. B64C 3/28
(52) U.S. Cl. .................. 244/123; 244/133; 244/158 A; 428/297.4
(58) Field of Search .............................. 244/117 R, 123, 244/133, 121, 158 A; 416/224, 229; 428/297.4, 298.1, 299.1, 45, 49, 66.7

(56) References Cited

U.S. PATENT DOCUMENTS

| | | | | |
|---|---|---|---|---|
| 3,637,325 A | * | 1/1972 | Morley | 416/230 |
| 3,779,487 A | * | 12/1973 | Ashton et al. | 244/123 |
| 4,051,289 A | * | 9/1977 | Adamson | 428/113 |
| 4,095,322 A | * | 6/1978 | Scarpati et al. | 29/889.6 |
| 4,284,443 A | * | 8/1981 | Hilton | 156/60 |
| 4,565,595 A | * | 1/1986 | Whitener | 156/156 |
| 4,657,615 A | | 4/1987 | Braun et al. | |
| 4,693,435 A | * | 9/1987 | Percival et al. | 244/91 |
| 5,248,242 A | | 9/1993 | Lallo et al. | |
| 5,395,691 A | * | 3/1995 | Kavesh et al. | 428/357 |
| 5,616,391 A | | 4/1997 | Amesz et al. | |
| 5,965,240 A | * | 10/1999 | Blackburn et al. | 428/192 |

FOREIGN PATENT DOCUMENTS

DE      12 14 092      4/1966

* cited by examiner

Primary Examiner—Michael J. Carone
Assistant Examiner—Gabriel S Sukman
(74) Attorney, Agent, or Firm—Bracewell & Patterson, L.L.P.

(57) ABSTRACT

A preform is joined to converging surfaces of a structure, such as an airfoil, to form a structural edge. The preform has a body having an acute-angle edge at one end and connecting areas extending from the opposing end for connecting the preform to converging planar elements of a wing or other similar structure. In several embodiments, the acute angle of the preform generally matches the angle relative to converging ends of the planar elements, the preform forming the outer end of smooth, continuous outer surfaces after assembly. The connecting areas may be connected to interior or exterior surfaces of the elements, depending on the orientation of the preform and elements. In another embodiment, the entire preform is placed between the outer ends of the elements for aligning and supporting the elements at the desired location and angle relative to each other.

27 Claims, 4 Drawing Sheets

PREFORMS FOR ACUTE STRUCTURAL EDGES

BACKGROUND OF THE INVENTION

1. Field of the Invention

The present invention relates generally to preforms for use in construction of vehicles and relates specifically to preforms used for forming acute structural edges.

2. Description of the Related Art

When constructing vehicles, it is often desirable or necessary to create edges formed using acute angles. This is especially true when constructing air vehicles, such as manned or unmanned aircraft and missiles, which may require a sharpened edge for smoothly penetrating the airflow or providing a smooth convergence of separate flows.

FIG. 1 shows a prior art aircraft 11 and illustrates the numerous locations of acute structural edges. The most common use of acute edges is in leading edges 13, 15 and trailing edges 17, 19 of wings 21, 23, respectively. Leading edges 13, 15 ensure that wings 21, 23 pass easily through a longitudinal airflow, whereas trailing edges 17, 19 allow the separated airflows on either side of wings 21, 23 to smoothly converge at the rear of wings 21, 23. Inlet lips 25 separate onrushing air into flows entering engine nacelles 27 and flows continuing on the outer surfaces of aircraft 11. Chines 29 are formed along longitudinal edges, providing desired aerodynamic effects and a blended shape for reducing radar cross-section.

FIGS. 2 through 4 illustrate prior art methods for forming acute structural edges. Though described in terms of directions relative to their orientation in the figures in the present application, it should be noted that the edges may be located in various orientations, including orientations opposite of those shown or in inclined or vertical orientations.

In FIG. 2, assembly 31 is formed by inserting a rigid edge member 33 between an upper planar element 35 and a lower planar element 37. Edge member 33 and elements 35, 37 may be formed from various materials, including metals and composites. When assembled, upper surface 39 of edge member 33 registers with the outer surface of element 35 and lower surface 41 registers with lower element 37, forming smooth, continuous outer surfaces for undisturbed airflow. A forward edge 43 has an acute included angle and is located on the forward portion of edge member 33. Members 45 extend from a rearward portion of edge member 33 for fastening edge member 33 to elements 35, 37. Members 45 are inwardly offset toward a plane (not shown) bisecting edge member 33 and parallel to forward edge 43, forming rearward-facing shoulders 47. The forward ends of elements 35, 37 abut shoulders 47. Typical methods of fastening edge member 33 to elements 35, 37 include adhering members 45 to the inner surfaces of elements 35, 37 and mechanically fastening members 45 to elements 35, 37.

FIG. 3 shows assembly 49, which is formed by assembling upper element 51 with lower element 53, elements 51, 53 being formed of rigid materials, such as metals or composites. Elements 51, 53 terminate in forward ends 55, 57, respectively, each forward end 55, 57 having an increased thickness and mating surface. When elements 51, 53 are assembled to each other, the mating surfaces are adjacent at seam 59 and forward ends 55, 57 are aligned to form forward edge 61. Elements 51, 53 are fastened together at forward ends 55, 57 by fastener 63, for example, a double-countersunk fastener, which extends through the thickness of the assembled forward ends 55, 57.

Like assembly 49 in FIG. 3, edge assembly 65 in FIG. 4 comprises upper element 67 and lower element 69. Upper element 67 has a forward end 71 having an increased thickness and a downward-facing mating surface. Lower element 69 has a forward end 73 that also has an increased thickness and an upward-facing mating surface. Elements 67, 69 are aligned and joined to each other, the mating surfaces being adjacent at seam 75 and forward ends 71, 73 aligning to form forward edge 77. Rather than being joined using fasteners, elements 67, 69 adhered to each other or bonded in a co-curing process.

While these prior art assemblies have satisfactorily been used to form acute edge structures, improvements are needed to reduce weight and cost and increase structural integrity of edge structures. Additionally, improvements are needed to improve the ability to repair damaged edge structures and to allow for tailored material and structural properties.

BRIEF SUMMARY OF THE INVENTION

An apparatus and method are provided for constructing acute structural edges. A preform has a body having an acute-angle edge at one end and connecting areas extending from the opposing end for bonding the preform to converging planar elements of a wing or other similar structure. In several embodiments, the acute angle of the preform generally matches the angle relative to each other of converging ends of the planar elements, the preform forming the outer end of smooth, continuous outer surfaces after assembly. The connecting areas may be connected to interior or exterior surfaces of the elements, depending on the orientation of the preform and elements. In another embodiment, the preform is placed between the outer ends of the elements for aligning and supporting the elements at the desired location and angle relative to each other.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings.

DETAILED DESCRIPTION OF THE INVENTION

FIGS. 5 through 9 show several edge assemblies using embodiments of the preform of the present invention. The preforms are preferably woven from selected fibers in a three-dimensional weave pattern, with fibers running in lateral, longitudinal, and vertical directions. The three-dimensional weave increases the strength of the preform and allows for tailoring of characteristics of the preform through selection of fiber materials and their position within the preforms. Preforms may alternatively be formed by other methods, including braiding, knitting, and stitching, that can be used to assemble fibers in an interlocking, three-dimensional pattern with control of fiber type and orientation. After completion of the edge assembly process, the fibers of the preforms are located within a rigid matrix, such as cured resin, providing the preforms with rigidity. As in the previous sections, the various embodiments are described in terms of directions relative to their orientation in the figures, though the edges may be located in various orientations, including orientations opposite of those shown or in inclined or vertical orientations.

Figure 1:
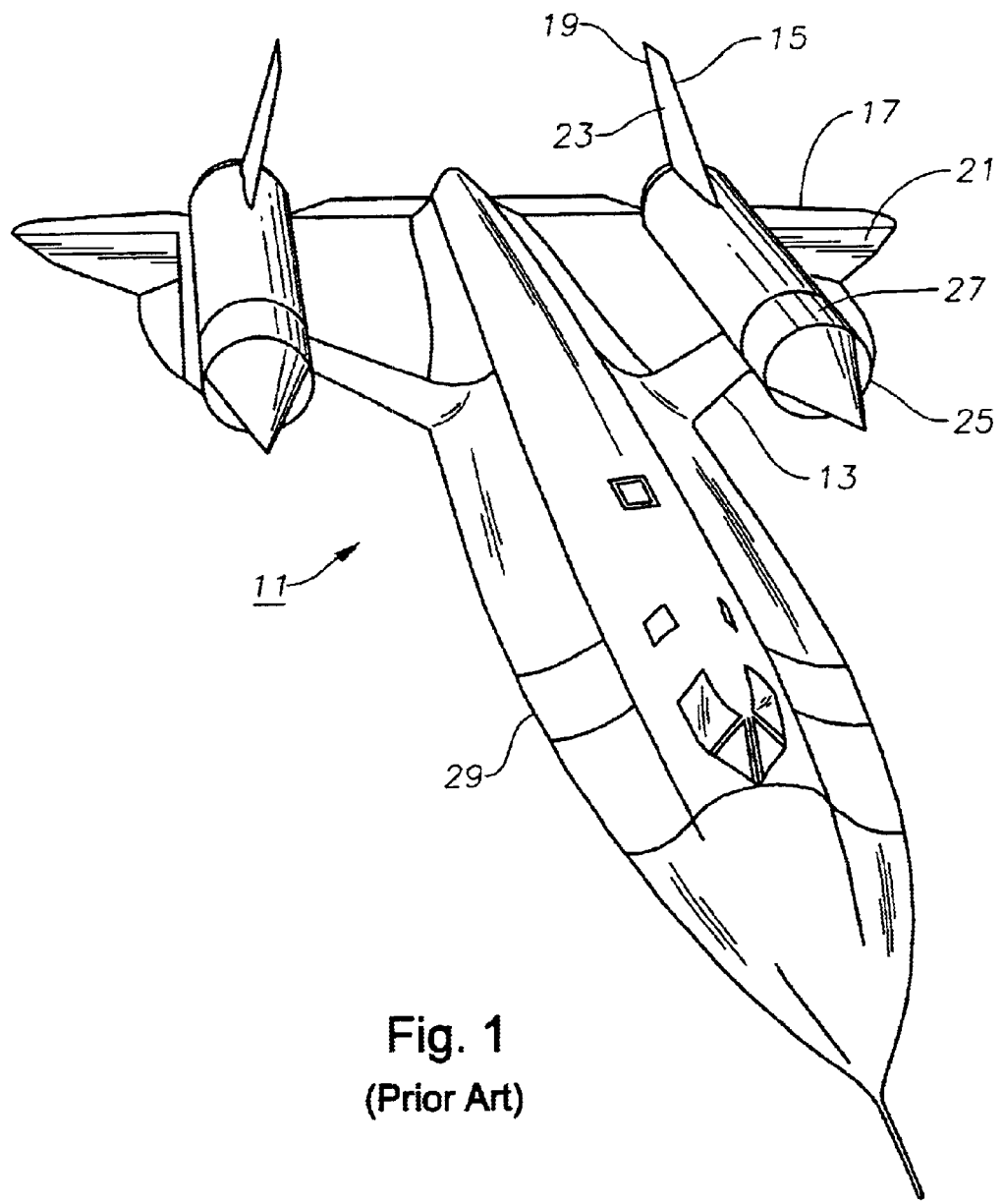
FIG. 1 is a perspective view of a prior art aircraft illustrating the locations of edge structures.
Figure 2:
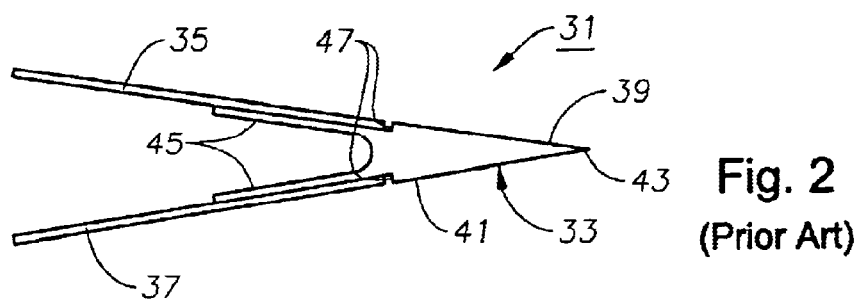
FIG. 2 is a schematic, cross-sectional view of a prior art edge structure.
Figure 3:
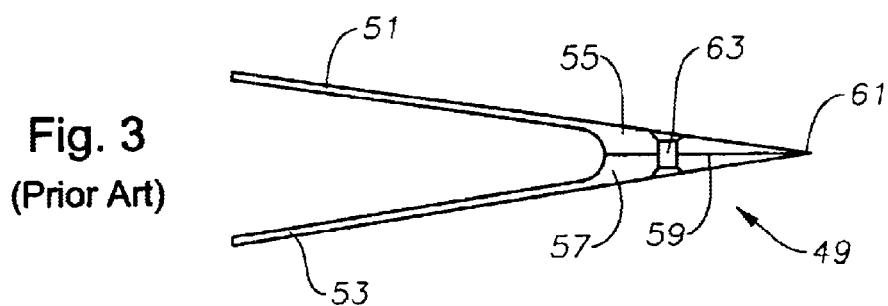
FIG. 3 is a schematic, cross-sectional view of a second type of prior art edge structure.
Figure 4:
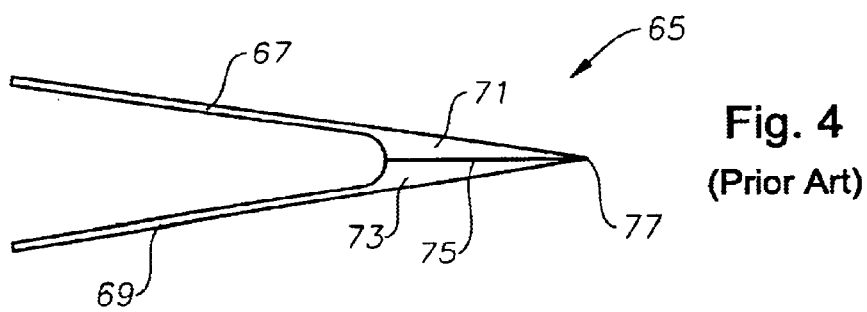
FIG. 4 is a schematic, cross-sectional view of a third type of prior art edge structure.
Figure 5:
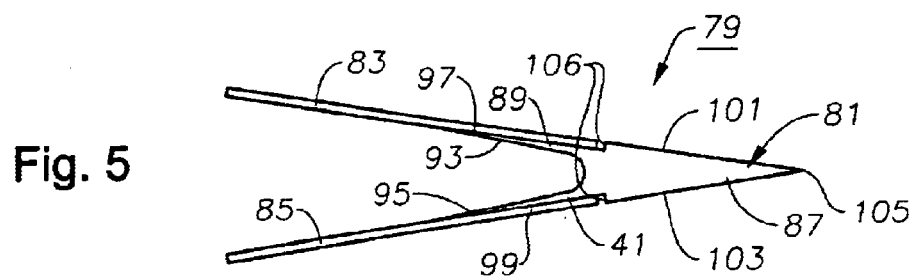
FIG. 5 is a schematic, cross-sectional view of an edge structure of the present invention.

Edge assembly 79 of FIG. 5 comprises preform 81 and upper and lower planar elements 83, 85 of a structure, such as an airfoil. Elements 83, 85 are formed from a rigid material, for example, cured composites or metal. Preform 81 is formed to have a body 87 and upper and lower extensions 89, 91 extending from a rear portion, or base, of body 87. The base may be arcuate, as shown, or may be planar. Extensions 89, 91 have inner surfaces 93, 95 and outer bonding surfaces 97, 99, respectively, inner surfaces 93, 95 terminating in tapered ends. Though not required in the most embodiments of the present invention, the use of tapered ends is preferred, as the tapered ends spread mechanical loads across a larger surface and provides better resistance to peel loads than a preform in which the longitudinal fiber layers all terminate at the same length. In some cases, however, truncated ends may be preferred, such as for repairs.

Body 87 has an upper surface 101 and a lower surface 103, or flanks, and bonding surfaces 97, 99 are generally parallel to surfaces 101, 103. Surfaces 101, 103 converge to an edge 105, or crest, at the forward end of preform 81. Extensions are inwardly offset toward a horizontal plane (not shown) that bisects body 87, forming shoulders 106 on a rear portion of body 87.

Preform 81 may be infused with resin prior to assembly for co-bonding to rigid planar elements 83, 85 (e.g., metal or cured composites) or for co-curing with uncured, composite elements 83, 85. Preform 81 may alternatively be cured prior to bonding to rigid elements 83, 85 or may be infused with resin after assembly, for example, by a resin-transfer molding process (RTM). Preform 81 may also be attached by mechanical fasteners.

In an assembly procedure of an uncured, infused, preform 81 and rigid elements 83, 85, preform 81 is positioned near the outer ends of planar elements 83, 85, and surfaces 101, 103 of preform 81 are generally aligned with the outer surfaces of elements 83, 85. Surfaces 97, 99 are placed adjacent the inner surfaces of elements 83, 85, and the outer ends of elements 83, 85 are placed against shoulders 106. Preform 81 is then cured to form a rigid edge structure, bonding extensions 89, 91 to the inner surfaces of elements 83, 85. After assembly, the outer surfaces of elements 83, 85 and surfaces 101, 103 of preform 81 form smooth, continuous surfaces.

Figure 6:
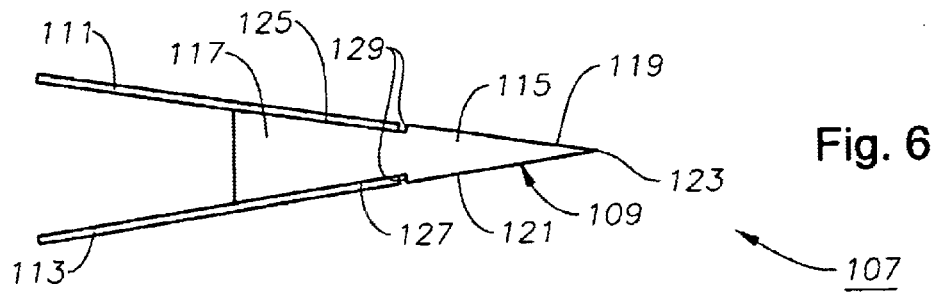
FIG. 6 is a schematic, cross-sectional view of a second embodiment of an edge structure of the present invention.

FIG. 6 shows edge assembly 107, comprising preform 109 and upper and lower planar elements 111, 113. Preform is formed to have body 115 shaped like that in the embodiment of FIG. 5, but differs from the previous embodiment in that only one extension 117 extends rearward from body 115. Body has outer surfaces 119, 121, or flanks, that converge to an edge 123, or crest. Extension 117 has upper and lower bonding surfaces 125, 127 that are generally parallel to surfaces 119, 121 of preform 109. Surfaces 125, 127 are inwardly offset, creating shoulders 129.

Assembly of preform 109 and elements 111, 113 is accomplished in a manner similar to that described for the previous embodiment. Preform 109 may be infused with resin and cured prior to assembly by co-bonding or mechanical fastening. Alternatively, preform 109 may be assembled uncured, or it may be infused after assembly. Bonding surfaces 125, 127 are bonded to the inner surfaces of elements 111, 113, and body 115 is cured to form a rigid edge with surfaces 119, 121 parallel to the outer surface of a corresponding element 111, 113.

Figure 7:
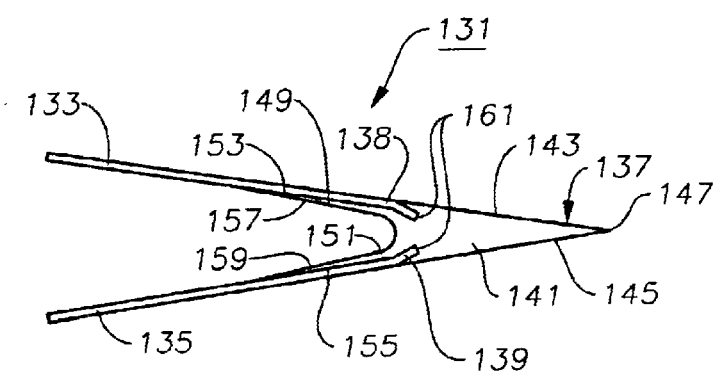
FIG. 7 is a schematic, cross-sectional view of a third embodiment of an edge structure of the present invention.

In FIG. 7, edge assembly 131 is formed of planar elements 133, 135 and preform 137. Each element 133, 135 has a forward flange 138, 139 that is angled inward relative to the remainder of elements 133, 135. Body 141 of preform 137 has outer surfaces 143, 145, or flanks, that taper to a forward edge 147, or crest. Extensions 149, 151 extend from the rear portion of body 141 and are formed to have outer bonding surfaces 153, 155 and tapered inner surfaces 157, 159. Channels 161 are formed in the rear portion of body 141 for receiving flanges 138, 139.

Edge assembly 131 is assembled by inserting each flange 138, 139 into a channel 161 of preform 137 and placing bonding surfaces 153, 155 adjacent the inner surfaces of elements 133, 135. The inner surfaces of channels 161 are adjacent the outer surfaces of flanges 138, 139. As described above, preform 137 may be attached to elements 133, 135 by co-curing, co-bonding, secondary bonding, and/or mechanical fastening.

Figure 8:
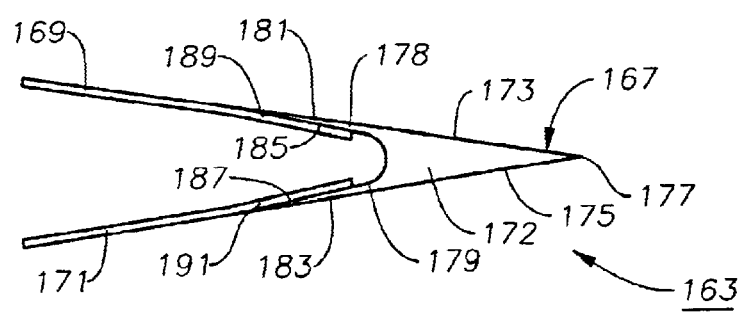
FIG. 8 is a schematic, cross-sectional view of a fourth embodiment of an edge structure of the present invention.
Figure 9:
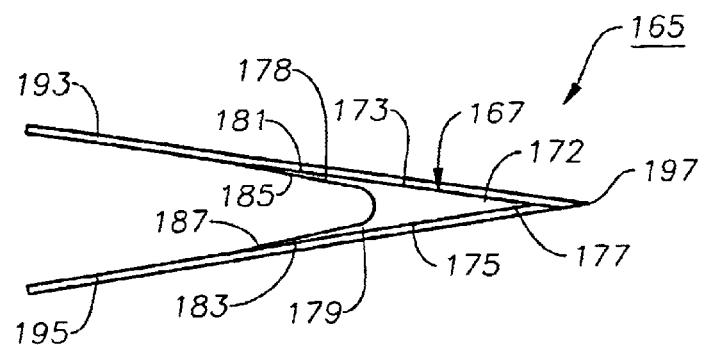
FIG. 9 is a schematic, cross-sectional view of a fifth embodiment of an edge structure of the present invention.

FIGS. 8 and 9 show edge assemblies 163 and 165 formed using preform 167. Referring to FIG. 8, planar elements 169, 171 are attached to preform 167. Preform 167 has a body 172 having outer surfaces 173, 175, or flanks, that converge to a forward edge 177, or crest. Extensions 178, 179 extend rearward from the rear portion of body 172, outer surfaces 181, 183 being parallel and continuous with surfaces 173, 175 of body 172. Inner surfaces 185, 187 of extensions 178, 179 are tapered toward a rear edge. Elements 169, 171 have forward flanges 189, 191, respectively, oriented to be slightly angled inward relative to the remainder of elements 169, 171, matching the angle of the taper on inner surfaces 185, 187.

To assemble edge assembly 163, planar elements 169, 171 are bonded or otherwise fastened to inner surfaces 185, 187. The outer surfaces of flanges 189, 191 are placed adjacent inner surfaces 185, 187, the angle of flanges 189, 191 following the taper of inner surfaces 185, 187. Extensions 178, 179 are positioned so that their rear, terminal ends lay at the intersection of flanges 189, 191 and the remainder of elements 169, 171, providing for a smooth, continuous transition from outer surfaces 173, 175 to the outer surfaces of elements 169, 171.

FIG. 9 shows edge assembly 165, comprising preform 167 and planar elements 193, 195. Rather than being attached to the inside of preform 167, elements 193, 195 are attached to outer surfaces 173, 175 of body 172 and outer surfaces 181, 183 of extensions 178, 179. Elements 193, 195 are positioned so that the forward portion of element 193 slightly overlaps the forward portion of element 195, forming forward edge 197. Preform 167 is located within a volume enclosed by elements 193, 195, and in the assembly shown, no portion of preform 167 forms an outer surface of edge assembly 165 or is exposed to airflow. Rather, preform 167 provides structural support and holds elements 193, 195 in the desired positions.

As mentioned above, preforms of the invention may be formed entirely of one of various types of fibers, or the preforms may be formed of multiple types of fibers for forming preforms having desired characteristics, such as increased mechanical stiffness, reduced electrical conductivity, reduced emissivity, and reduced reflectivity. Alternatively, the preforms may be formed of one or more types of fibers, with fibers in selected portions of the preform having coatings on the fibers or being otherwise altered to provide desired characteristics.

Figure 10:
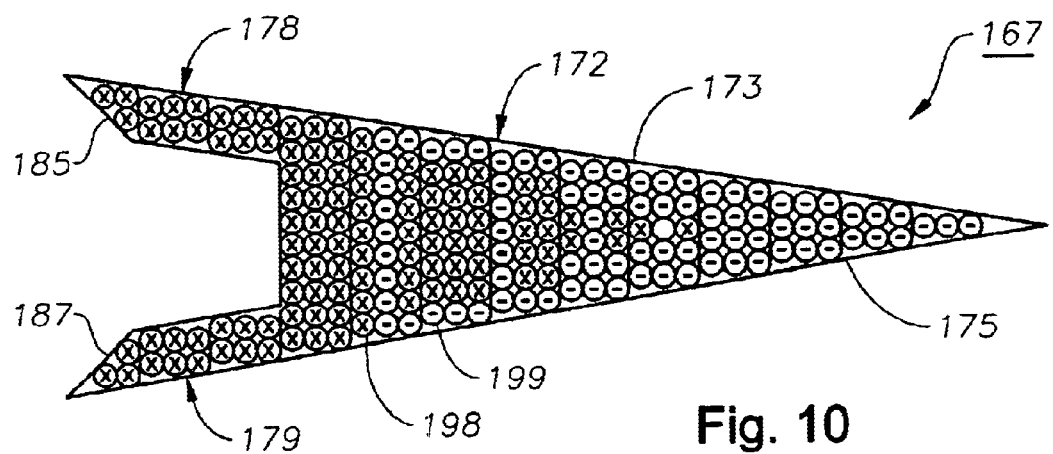
FIG. 10 is a schematic, cross-sectional view of the preform of FIG. 8 illustrating fibers within the preform.

FIG. 10 is a schematic, cross-sectional view of preform 167 showing the use of two different types of warp fibers in the weave. Fibers 198 are indicated with an "x," and fibers 199 are indicted by a "-." Fibers 198, which are located in extensions 178, 179 and the rear and interior portion of body 172, are preferably higher strength fibers, for example, carbon fibers. Fibers 198 are positioned in locations where stresses are higher, such as bonding areas. Fibers 199, which may be glass fibers or similar types, are located in outer surfaces 173, 175, reducing electrical conductivity in outer portions of the preform. Fibers 199 allow for tailoring of electrical conductivity, emissions of internal electromagnetic energy, and radar wave reflectivity.

Figure 11:
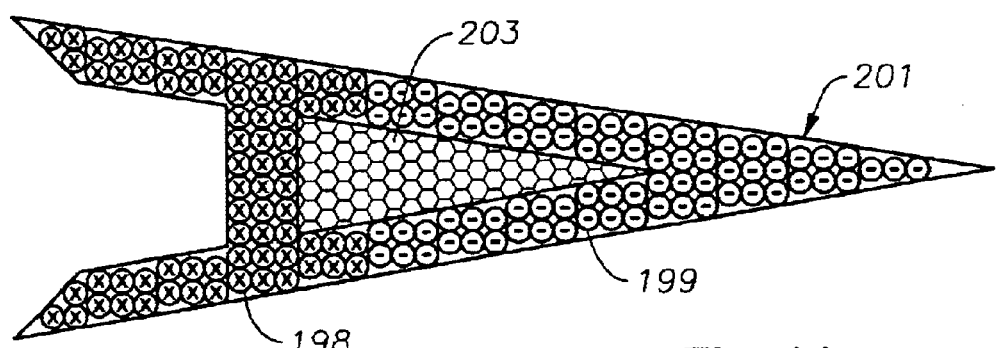
FIG. 11 is a schematic, cross-sectional view of the preform of FIG. 8 illustrating fibers and a core within the preform.

Referring to FIG. 11, a cross-sectional view of a preform 201 shows an insert 203, which may be formed of foam or honeycomb and is located in the interior of preform 201. A three-dimensional weave of fibers 198 and 199 is produced around insert 201, which provides a rigid structural member for support during weaving. Fibers 198, 199 and insert 203 may be coated or otherwise modified to produce desired characteristics, such as those discussed above. Preform 201 is shown as having a shape like that of preform 167, though an insert like insert 203 may be used to form any of the preforms within the scope of this invention.

Many advantages are realized from using the present invention. Edge structures can be easily formed from preforms that allow for tailoring of the characteristics of the preform by altering the types and locations of materials in the preform. These structures are lightweight, and can be tailored for desired strength, flexibility, emissivity, and reflectivity. The preforms provide for lower cost of assembly and increased structural integrity. Reparability is enhanced, since the preforms may be installed and removed as a unit, which also decreases the man-hours required to repair a damaged edge assembly.

While the invention has been shown in only some of its forms, it should be apparent to those skilled in the art that it is not so limited, but is susceptible to various changes without departing from the scope of the invention. For example, though shown as flat, the planar elements may be curved, and the preforms may be formed and cured to match the curvature of the elements. Also, preforms may be formed from a variety of composite materials, including metal- and ceramic-matrix composites or fiber-reinforced adhesives.

I claim:

1. A member for forming an edge of a structure having two converging surfaces that converge toward each other at a converging angle, the member comprising:

a body having a pair of flanks converging to form an edge at a crest, the flanks adapted to converge at the converging angle;

a pair of connecting surfaces, each extending from one of the flanks in a direction opposite the crest, each connecting surface being substantially parallel to one of the flanks; and wherein the member is formed of fibers assembled in a three-dimensional pattern and located within a rigid matrix;

the connecting surfaces are adapted to be connected to the converging surfaces of the structure; and each connecting surface lies in a plane offset from a plane of each corresponding flank, defining a shoulder for abutting an end of one of the converging surfaces of the structure.

2. The member of claim 3, wherein:

the fibers comprise at least two types of fibers, which are selectively located within the member for optimizing selected qualities.

3. The member of claim 1, wherein:

each of the connecting surfaces is in a common plane with one of the flanks.

4. A member for forming an edge of a structure having two converging surfaces that converge toward each other at a converging angle, the member comprising:

a body having a pair of flanks converging to form an edge at a crest, the flanks adapted to converge at the converging angle;

a pair of connecting surfaces, each extending from one of the flanks in a direction opposite the crest, each connecting surface being substantially parallel to one of the flanks; and wherein the member is formed of fibers assembled in a three-dimensional pattern and located within a rigid matrix;

the connecting surfaces are adapted to be connected to the converging surfaces of the structure;

the body has a base, the flanks extending from the base to the crest; and the connecting surfaces are formed on extension portions that are spaced apart and extend from the base.

5. The member of claim 4, wherein:

the extension portions terminate in tapered ends.

6. The member of claim 5, wherein:

the base is arcuate.

7. A member for forming an edge of a structure having two converging surfaces that converge toward each other at a converging angle, the member comprising:

a body having a pair of flanks converging to form an edge at a crest, the flanks adapted to converge at the converging angle;

a pair of connecting surfaces, each extending from one of the flanks in a direction opposite the crest, each connecting surface being substantially parallel to one of the flanks; and wherein the member is formed of fibers assembled in a three-dimensional pattern and located within a rigid matrix;

the connecting surfaces are adapted to be connected to the converging surfaces of the structure; and the body has an internal cavity containing a rigid, non-woven core.

8. An edge structure, comprising:

two converging surfaces;

an edge member, the edge member being formed of fibers in a three-dimensional, interlocking pattern and within a rigid matrix, the edge member having a body with two flanks converging to an acute-angle edge at a crest;

a pair of connecting surfaces, each extending from the flanks away from the crest and being joined to one of the converging surfaces in overlapping relation; and wherein the converging surfaces have spaced apart, truncated ends;

the connecting surfaces form a smooth junction with the truncated ends; and the flanks of the edge member protrude past the truncated ends.

9. The member of claim 8, wherein:

the body has an internal cavity containing a rigid, non-woven core.

10. An edge structure, comprising:

two converging surfaces;

an edge member, the edge member being formed of fibers in a three-dimensional, interlocking pattern and within a rigid matrix, the edge member having a body with two flanks converging to an acute-angle edge at a crest;

a pair of connecting surfaces, each extending from the flanks away from the crest and being joined to one of the converging surfaces in overlapping relation; and wherein the converging surfaces have spaced apart, truncated ends;

the connecting surfaces are located within and joined to interior portions of the converging surfaces; and the flanks of the edge member protrude past the truncated ends.

11. The structure of claim 10, wherein:

each connecting surface lies in a plane offset from a plane of each corresponding flank, defining a shoulder for abutting an end of one of the converging surfaces of the structure.

12. An edge structure, comprising:

two converging surfaces;

an edge member, the edge member being formed of fibers in a three-dimensional, interlocking pattern and within a rigid matrix, the edge member having a body with two flanks converging to an acute-angle edge at a crest;

a pair of connecting surfaces, each extending from the flanks away from the crest and being joined to one of the converging surfaces in overlapping relation; and wherein the converging surfaces have spaced apart, truncated ends;

each connecting surface is joined to exterior portions of the converging surfaces; and the flanks of the edge member protrude past the truncated ends.

13. The structure of claim 10, wherein:

the body has a base, the flanks extending from the base to the crest; and the connecting surfaces are formed on extension portions that are spaced apart and extend from the base, the extension portions terminating in tapered ends.

14. The structure of claim 13, wherein:

the base is arcuate.

15. An edge structure, comprising:

two converging surfaces;

an edge member, the edge member being formed of fibers in a three-dimensional, interlocking pattern and within a rigid matrix, the edge member having a body with two flanks converging to an acute-angle edge at a crest;

a pair of connecting surfaces, each extending from the flanks away from the crest and being joined to one of the converging surfaces in overlapping relation; and wherein the converging surfaces have spaced apart, truncated ends;

the connecting surfaces are located on opposing sides of an extension, each connecting surface lying in a plane offset from a plane of each corresponding flank, defining a shoulder for abutting an end of one of the converging surfaces of the structure, the extension being located within the converging surfaces, the connecting surfaces being joined to interior portions of the converging surfaces; and the flanks of the edge member protrude past the truncated ends.

16. An edge structure, comprising:

two converging surfaces;

an edge member, the edge member being formed of fibers in a three-dimensional, interlocking pattern and within a rigid matrix, the edge member having a body with two flanks converging to an acute-angle edge at a crest;

a pair of connecting surfaces, each extending from the flanks away from the crest and being joined to one of the converging surfaces in overlapping relation; and wherein the body has a base, the flanks extending from the base to the crest;

the converging surfaces have spaced apart ends bent out-of-plane to form flanges;

the connecting surfaces are formed on a tapered, interior portion of extension portions that are spaced apart and extend from the base, the connecting surfaces being joined to exterior portions of the converging surfaces; and the flanks of the edge member extend past the flanges.

17. An edge structure, comprising:

two converging surfaces having spaced apart, truncated ends;

a edge member, the edge member being formed of fibers in an interlocking, three-dimensional pattern and having a body with two flanks converging to an acute-angle edge at a crest; and a pair of connecting surfaces, each extending from the flanks away from the crest and being joined to one of the converging surfaces in overlapping relation; and wherein the flanks of the edge member protrude past the truncated ends.

18. The edge structure of claim 17, wherein:

the truncated ends are bent out-of-plane to form flanges;

the edge member is formed to have pockets between the connecting surfaces and the flanks, the flanges being received within the pockets, the connecting surfaces being joined to interior portions of the converging surfaces, inner surfaces of the pockets being joined to interior and exterior portions of the converging surfaces; and the flanks of the edge member protrude past the truncated ends.

19. The edge structure of claim 17, wherein:

the connecting surfaces are located on opposing sides of an extension, each connecting surface lying in a plane offset from a plane of each corresponding flank, defining a shoulder for abutting the end of one of the converging surfaces, the extension being located within the converging surfaces, the connecting surfaces being joined to interior portions of the converging surfaces; and the flanks of the edge member protrude past the truncated ends.

20. The edge structure of claim 17, wherein:

the converging surfaces have spaced apart ends bent out-of-plane to form flanges;

the connecting surfaces are formed on a tapered, interior portion of each of a pair of extension portions that are spaced apart and extend from the body opposite the crest, the connecting surfaces being joined to exterior portions of the converging surfaces; and the flanks of the edge member extend past the flanges.

21. An edge structure, comprising:

two converging surfaces that join each other to form an external edge portion;

an edge member formed of fibers in a three-dimensional, interlocking pattern and located within a rigid matrix, the edge member having a body and extension portions, the body having a base and a crest, a pair of flanks extending between the base and the crest and converging to form an edge at the crest, each extension portion extending opposite the crest from the base and terminating in a tapered end, a connecting surface being formed on an exterior portion of each extension, each connecting surface being substantially parallel to one of the flanks; and wherein each of the connecting surfaces is in a common plane with one of the flanks;

the connecting surfaces are connected to interior portions of the converging surfaces of the structure; and the entire edge member is located internally within the converging surfaces.

22. The structure of claim 21, wherein:

the body has an internal cavity containing a rigid, non-woven core.

23. The structure of claim 21, wherein:

the base is arcuate.

24. An edge structure, comprising:

two converging surfaces that have spaced apart, truncated ends;

an edge member formed of fibers assembled in a three-dimensional pattern and located within a rigid matrix, the edge member having a body and a connecting portion, the body having a base and a crest, a pair of flanks extending between the base and the crest and converging to form an edge at the crest, the connecting portion extending opposite the crest from the base and terminating in a truncated end, two connecting surfaces being formed on opposite sides of the connecting portion and being substantially parallel to one of the flanks; and wherein each connecting surface lies in a plane offset from a plane of each corresponding flank, defining a shoulder for abutting the end of one of the converging surfaces;

the connecting portion is located within the converging surfaces, the connecting surfaces being joined to interior portions of the converging surfaces; and the flanks of the edge member protrude past the truncated ends.

25. The structure of claim 24, wherein:

the body has an internal cavity containing a rigid, non-woven core.

26. A method of forming an edge structure, the method comprising:

(a) forming an edge member of fibers in a three-dimensional pattern and located in a rigid matrix, the member having a body with a pair of flanks and connecting surfaces extending from the body, the flanks converging to an edge;

(b) positioning the edge member relative to the converging surfaces so that the body protrudes past truncated ends of the converging surfaces; and (c) joining each connecting surface to one of a pair of converging surfaces to form an edge structure.

27. A method of forming an edge structure, the method comprising:

(a) forming an edge member of fibers in a three-dimensional pattern and located in a rigid matrix, the member having a body with a pair of flanks and connecting surfaces extending from the body, the flanks converging to an edge;

(b) positioning ends of the converging surfaces adjacent each other to form an edge, then positioning the edge member within an interior formed by the converging surfaces; and (c) joining each connecting surface to one of a pair of converging surfaces to form an edge structure and joining the connecting surfaces and each flank to an interior portion of the converging surfaces.

* * * * *